United States Patent [19]
Nelson

[11] Patent Number: 5,815,225
[45] Date of Patent: Sep. 29, 1998

[54] LIGHTING APPARATUS FOR A PORTABLE COMPUTER WITH ILLUMINATION APERTURES

[75] Inventor: Richard F. Nelson, Butte, Mont.

[73] Assignee: Gateway 2000, Inc., North Sioux City, S. Dak.

[21] Appl. No.: 786,268

[22] Filed: Jan. 22, 1997

[51] Int. Cl.[6] ...................... G02F 1/1335; G02F 1/1333; G02F 1/13
[52] U.S. Cl. ................................ 349/665; 349/1; 349/58; 362/26; 362/31; 361/681
[58] Field of Search .................................. 349/1, 58, 65; 362/31, 26; 361/681

[56] References Cited

U.S. PATENT DOCUMENTS

| | | | |
|---|---|---|---|
| 4,323,951 | 4/1982 | Pasco | 362/27 |
| 5,146,354 | 9/1992 | Plesinger | 359/49 |
| 5,207,493 | 5/1993 | Murase et al. | 362/31 |
| 5,211,464 | 5/1993 | Bohmer | 362/31 |
| 5,283,673 | 2/1994 | Murase et al. | 349/65 |
| 5,394,308 | 2/1995 | Watanabe et al. | 362/31 |
| 5,477,432 | 12/1995 | Magic et al. | 362/26 |
| 5,504,605 | 4/1996 | Sakuma et al. | 349/58 |
| 5,521,797 | 5/1996 | Kashima et al. | 362/31 |
| 5,559,911 | 9/1996 | Forkner et al. | 385/33 |

FOREIGN PATENT DOCUMENTS

| | | | |
|---|---|---|---|
| 4-80715 | 3/1992 | Japan | 349/65 |

*Primary Examiner*—Anita Pellman Gross
*Attorney, Agent, or Firm*—Schwegman, Lundberg, Woessner & Kluth, P.A.

[57] ABSTRACT

A lap top computer system is provided having a light emitting device for illuminating a keyboard, and the surrounding work area. The apparatus operates to convey light from the liquid crystal display backlighting light source to the keyboard and work area utilizing light pipes. The light pipes transmit light from the backlighting system light source to lenses located on a surface of the computer body. The lenses are provided with adjustable doors covering the light source for varying the level of illumination.

10 Claims, 3 Drawing Sheets

LIGHTING APPARATUS FOR A PORTABLE COMPUTER WITH ILLUMINATION APERTURES

FIELD OF THE INVENTION

The present invention relates generally to portable computers. More particularly, it pertains to an illumination device for a lap top computer.

BACKGROUND OF THE INVENTION

The use of lap top computers has increased dramatically as they have become more portable, and simultaneously more powerful. Computer users are now inclined to use their computers in places previously not possible before the prevalence of lap top computers. Lap top computers are now being utilized in places such as in automobiles, planes, at home in an easy chair, or in bed. These places are much more comfortable to a user or at least provide more flexibility for users to have access to a computer. However, the surrounding environment may not always provide a suitable work area, and often has insufficient lighting conditions. For screen illumination, lap top computers have been provided with a liquid crystal display with internal backlighting to illuminate the images created by the liquid crystal compound. The backlighting systems provide a viewable image on the computer screen, even in low levels of ambient light. The backlighting systems typically consist of a light source and a light pipe located next to and aligned parallel with the back surface of the liquid crystal display. The light source is conventionally a fluorescent tube attached to at least one edge surface of the light pipe. A reflective material may be wrapped around the light source to redirect light from the light source into the light pipe. The backlighting systems are limited to providing illumination to the liquid crystal display, and the keyboard and the surrounding work area remain poorly illuminated in conditions where only limited lighting is available.

Versatility of a lap top computer is currently limited because of the difficulty in viewing the keyboard in the dark, and computer users are operating lap top computers in locations where only limited light is available. Furthermore, lap top keys are small and located in close proximity to one another, increasing the need for a computer user to view the keys.

Accordingly, there is a need for a better way to provide lighting beyond the liquid crystal display for computer users which is integral to a lap top computer system, and can be implemented using current computer systems.

SUMMARY OF THE INVENTION

A lap top computer system is provided having a light emitting device for illuminating a keyboard, and the surrounding work area. The apparatus operates to convey light from the liquid crystal display backlighting to the keyboard and work area through lenses located on a surface of the computer body. The lenses are provided with adjustable doors for covering the light source to vary the level of illumination.

The lighting apparatus for a lap top computer comprises a light source, a liquid crystal display case encompassing a liquid crystal display, an illumination aperture, and a means for conveying light. In one embodiment, the light conveying means, a light pipe or an acrylic lens, optically communicates between the light source and the illumination aperture. The liquid crystal display case contains the illumination apertures, each having a corresponding lens for transmitting light to the keyboard. The lens has a slightly convex shape for illuminating a field surrounding the lens, including the keyboard and a portion of the work area. In another embodiment, the lens is provided with a door member for limiting the amount of transmitted illumination.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
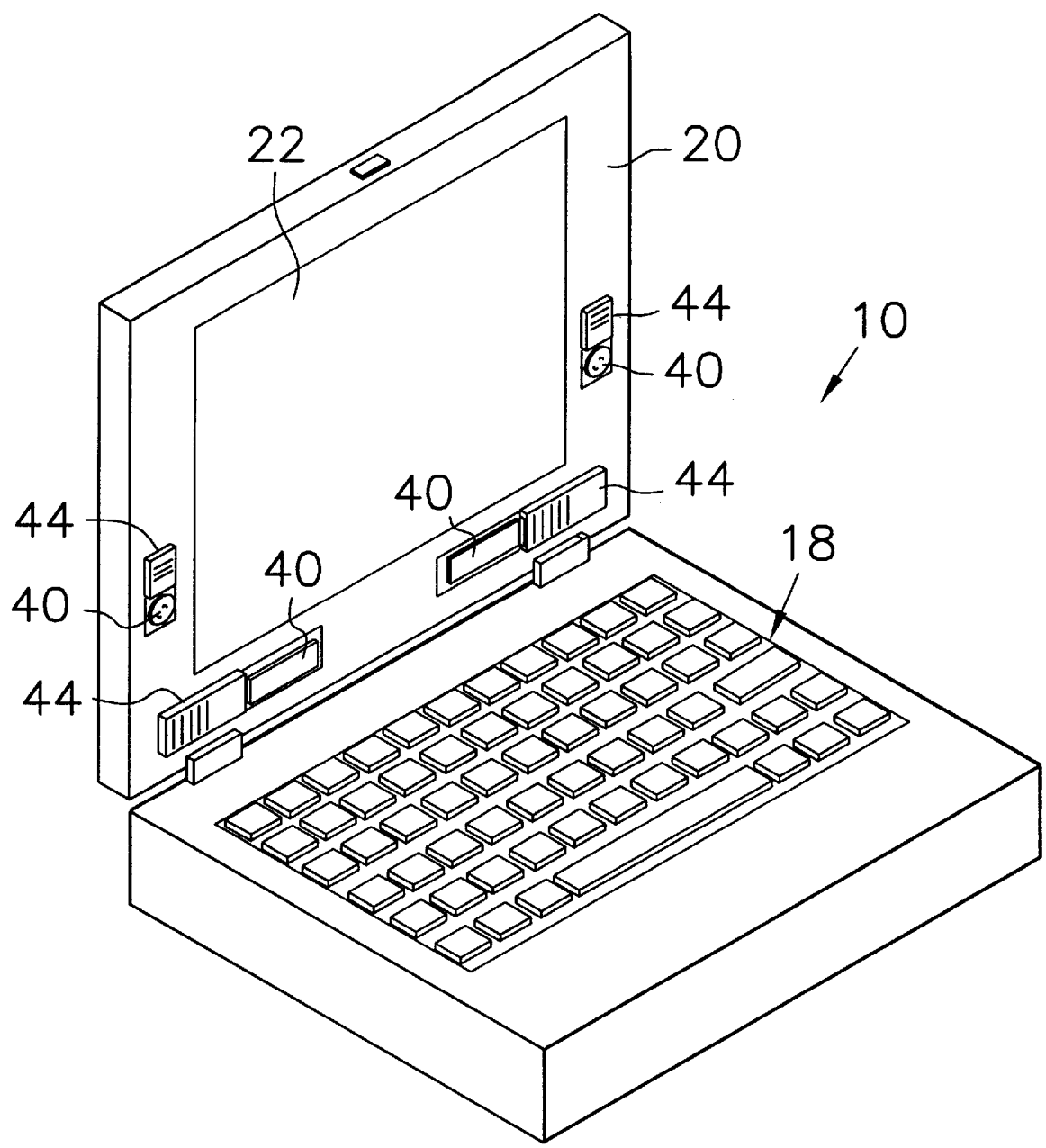
FIG. 1 is a perspective view illustrating a computer system constructed in accordance with one embodiment of the present invention.
Figure 2:
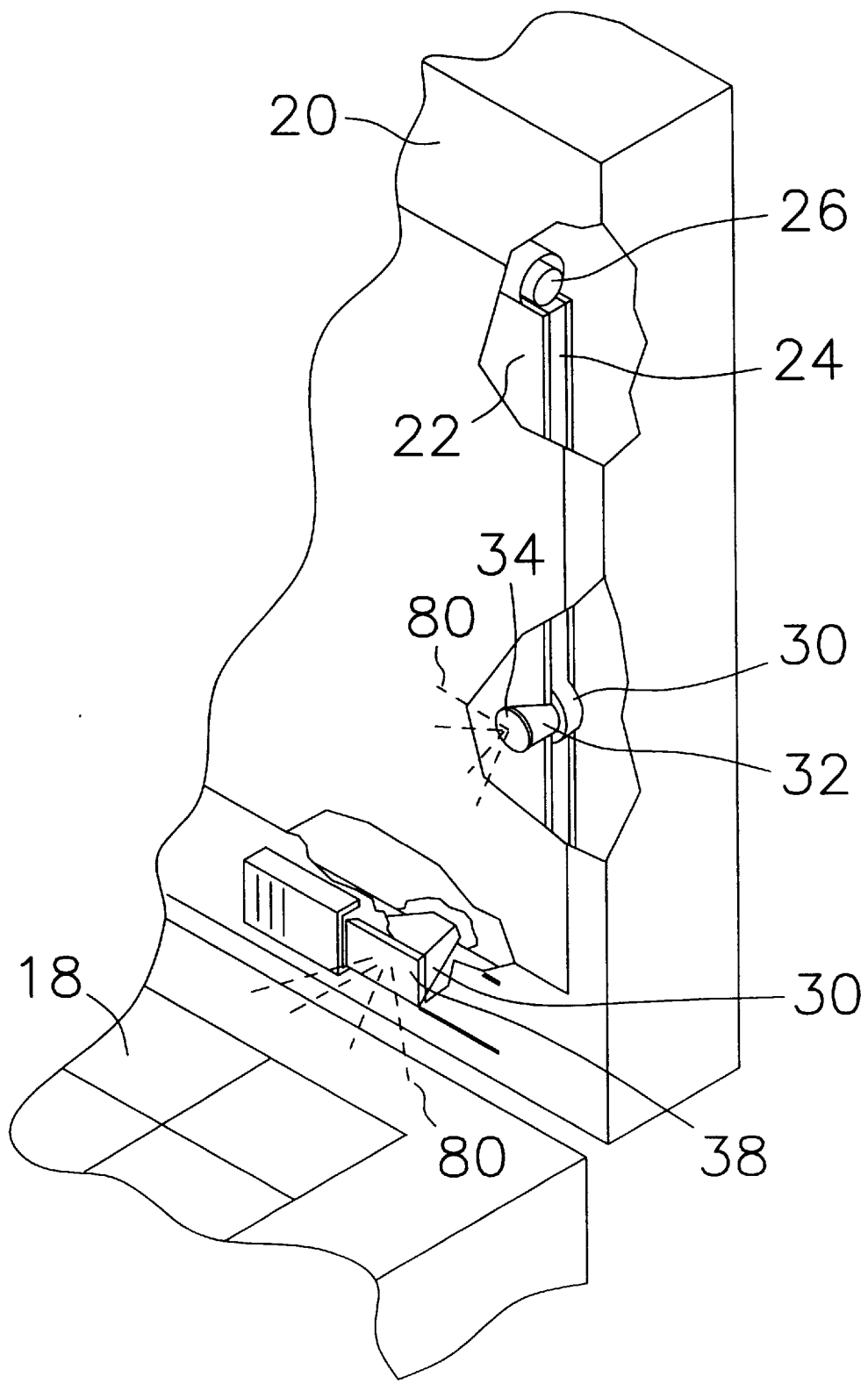
FIG. 2 is a cut-away perspective view of the computer system constructed in accordance with another embodiment of the present invention.
Figure 3:
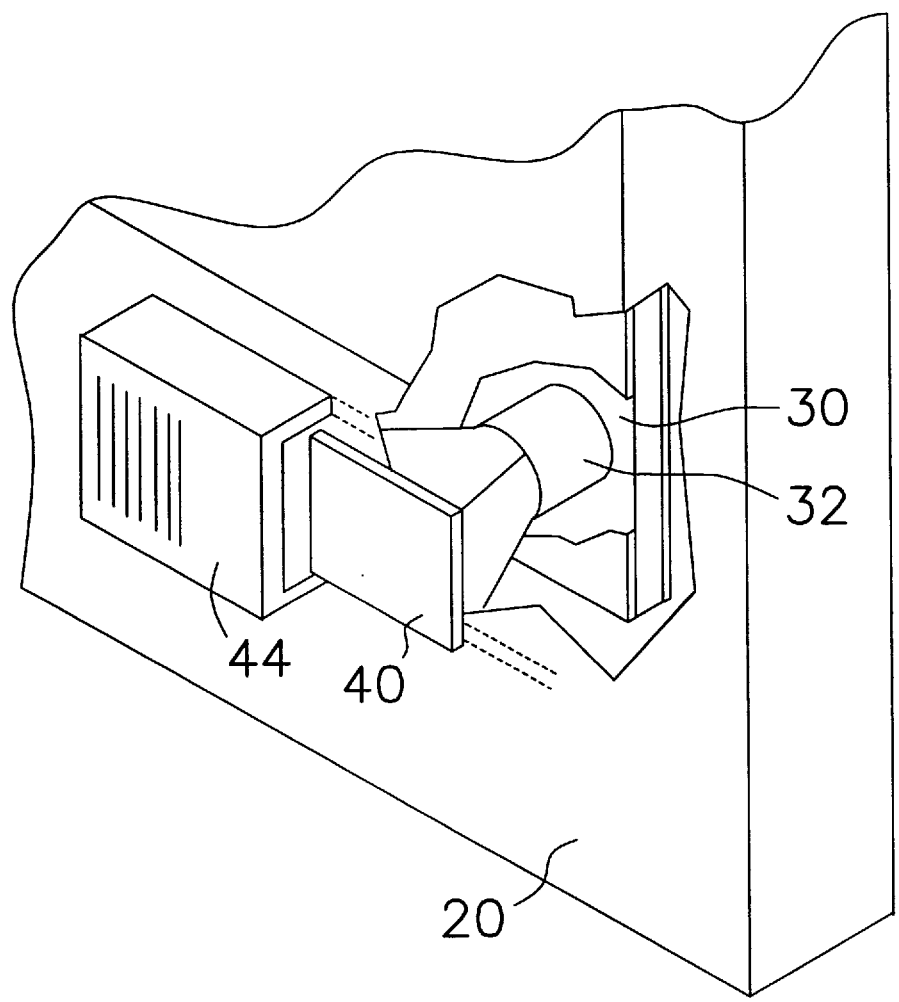
FIG. 3 is an enlarged cut-away perspective view of the computer system constructed in accordance with yet another embodiment of the present invention.

As shown in FIGS. 1–3, a lap top computer 10 has a display case 20 hingedly connected to a keyboard 18 and computer system. The display case 20 surrounds a liquid crystal display panel 22 covered by a transparent protective panel. Lenses 40 disposed within the display case 20 transmit illumination 80 from a conventional light source (not shown) to the keyboard 18 and surrounding work area. Referring to FIG. 2, the illumination 80 can be adjusted by a computer operator with door members 44 provided on the display case.

As illustrated particularly in FIG. 2, a conventional light source 26, such as a cold cathode fluorescent lamp, is provided at the back of the liquid crystal display panel 22. The light source 26 illuminates the liquid crystal display panel 22 from the rear side. A light distribution medium 24 is disposed at the back of the liquid crystal display panel 22 and abutting the light source 26. Each light distribution medium 24 is constructed to transmit light from a source and evenly distribute the light over the entire surface areas of the liquid crystal display panel 22.

One such light distribution medium 24 comprises a light pipe which communicates with a light source 26 and distribute the light over the surface area of a liquid crystal display panel 22. Various light pipe constructions are known and may be employed which have different diffusion, scattering, reflection, and distribution characteristics. Also suitable for use in the invention are constructions other than light pipes that transmit and evenly distribute light over a flat surface area and have a relatively thin cross-section such as conventional light curtains or diff-users.

In one embodiment of the lighting apparatus, a single light source 26 is disposed within the liquid crystal display case 20 adjacent to one edge of the panel. The light source 26 is intended to provide light to the distribution medium 24 for distribution over the liquid crystal display panel 22. The light source 26 is preferably a cold cathode fluorescent lamp of an elongate construction extending essentially the entire length of the edge surface of the panel adjacent to which it is installed.

The liquid crystal display case 20 is provided with an illumination aperture 38. The illumination aperture 38 can be formed by boring through the display case 20 during fabrication of the case 20. Extending from an edge surface of the LCD case 20 to the light distribution medium 24, the illumination aperture is sized to receive a second light distribution medium. The aperture 38 is disposed proximate to the keyboard 18. In one embodiment of the invention, a plurality of apertures are provided to ensure sufficient illumination is transmitted to the keyboard. Although other arrangements are contemplated, in one embodiment, two apertures are disposed on each side of the liquid crystal display. Additionally, two illumination apertures are provided beneath the liquid crystal display.

The second light distribution medium is provided to transmit light from the light distribution medium 24, located behind the liquid crystal display panel 22, to the computer keyboard 18. In one embodiment, the second light distribution mechanism are lenses 40. The lenses 40, having an outer surface 34, are disposed integrally within the illumination aperture 38. One end of each lens is disposed adjacent to the light distribution medium 24. The outer surface 34 of each lens is disposed relatively flush with the LCD panel 22, such that light may be transmitted from the light distribution medium 24 to the keyboard 18.

As shown in FIG. 3, each lens 40 is sized to be received within the illumination aperture 38. The outer shape of the lens 40 corresponds to the shape of the illumination aperture 38. The profile of the lens 40 is slightly convex (not shown) such that light is not directed in one particular direction, but illuminates a field proximate the lens. In one embodiment, the lens 40 and the respective illumination aperture 38 are square shaped. Another embodiment provides a lens 40 and aperture 38 having a circular shape, although any shape may be used.

When assembled, each lens 40 may be secured to the display case 20 when it is inserted into the illumination aperture 38. The lenses 40 are sized such that when secured, the exterior surface of each lens 40 is substantially aligned with an exterior surface of the display case. The lenses 40 may be fabricated from a plastic material such as acrylic, glass, or any material which permits the transmission of light through the lens 40 sufficient to illuminate at least a portion of the keyboard 18.

The lenses 40 may be secured to the LCD case 20 by a number of attachment methods known in the art. For instance, the lens 40 may be integrally molded within the display case 20, the lens 40 can be ultrasonically welded to the display case 20, an adhesive substance can be applied between the lens 40 and the display case 20, or a sealing gasket can be provided between the lens 40 and the display case 20 such that impurities from the environment are not admitted into the internal computer components.

In an alternative embodiment, as shown in FIG. 3, a door member 44 is provided. The door member 44 is slidably mounted within a surface of the liquid display case 20, adjacent to the illumination aperture 38. Each door member 44 is sized to cover a corresponding lens 40. Preferably, the door member 44 is substantially flat, thereby eliminating interference with the keyboard 18 when the lap top computer is in a closed position. A computer user may slide the door member 44 over the lens 40 to limit the amount of illumination provided to the keyboard 18. If the user does not desire to have any illumination provided by the lighting apparatus, the door member 44 can be extended fully over the illumination aperture 38, thereby substantially preventing light from being transmitted through the lens 40 to the keyboard 18.

The current invention efficiently uses a current lighting source for a computer system. The lighting apparatus provides illumination for the keyboard and surrounding work area without requiring additional power or an additional light source. Furthermore, it allows a computer user to view the keyboard while working in surroundings having limited ambient light.

It is to be understood that the above description is intended to be illustrative, and not restrictive. Many other embodiments will be apparent to those of skill in the art upon reviewing the above description. For instance, an illumination aperture and lens may be provided on other surfaces of the computer for providing light to a surrounding work area. The scope of the invention should, therefore, be determined with reference to the appended claims, along with the full scope of equivalents to which such claims are entitled.

What is claimed is:

1. A lighting apparatus for illuminating a keyboard on a lap top computer, comprising:

a light source for backlighting a liquid crystal display screen, said light source including a light distribution medium;

a liquid crystal display case, the liquid crystal display case having at least one illumination aperture therein; and a door member slidably mounted on said screen body for covering said illumination apertures, said door member being adjustably mounted thereon.

2. The lighting apparatus as recited in claim 1, wherein the light source is a cold cathode fluorescent lamp placed adjacent the light distribution medium.

3. The lighting apparatus as recited in claim 1, wherein the light distribution medium is a light pipe.

4. The lighting apparatus as recited in claim 1, wherein the at least one illumination aperture is disposed below the liquid crystal display screen.

5. The lighting apparatus as recited in claim 1, wherein the at least one illumination aperture is disposed on at least one side of the liquid crystal display screen.

6. The lighting apparatus as recited in claim 1, wherein the liquid crystal display case has a plurality of illumination apertures.

7. The lighting apparatus as recited in claim 1, wherein the at least one illumination aperture has a lens disposed therein.

8. The lighting apparatus as recited in claim 7, the at least one illumination aperture and an outer surface of the corresponding lens having a square or rectangular shape.

9. The lighting apparatus as recited in claim 7, the at least one illumination aperture and an outer surface of the corresponding lens having a circular shape.

10. A lighting apparatus for illuminating a keyboard on a lap top computer, comprising:

a light source for backlighting a liquid crystal display screen, said light source comprising a cold cathode fluorescent lamp placed adjacent a light distribution medium;

a liquid crystal display case;

a liquid crystal display disposed within the liquid crystal display case;

the liquid crystal display case having four illumination apertures therein, two of the illumination apertures having a circular shape being disposed on each side of the liquid crystal display, two of the illumination apertures having a rectangular shape being disposed below said liquid crystal display;

four lenses disposed within said illumination apertures, said lenses for transmitting light from the light distribution medium through the illumination aperture; and a door member slidably mounted on said screen body for covering said illumination apertures, said door member being adjustably mounted thereon.

\* \* \* \* \*

UNITED STATES PATENT AND TRADEMARK OFFICE
CERTIFICATE OF CORRECTION

PATENT NO. : 5,815,225
DATED       : September 29, 1998
INVENTOR(S) : Richard F. Nelson It is certified that error appears in the above-identified patent and that said Letters Patent is hereby corrected as shown below:

On the title page item [56], add

--08076882    03/22/96    Japan 3046881       09/09/82    Germany

97/04437      02/06/97    PCT--.

Signed and Sealed this

Fourteenth Day of September, 1999

Attest:

Q. TODD DICKINSON

Attesting Officer     Acting Commissioner of Patents and Trademarks